United States Patent [19]

Kaneko et al.

[11] Patent Number: 4,585,052
[45] Date of Patent: Apr. 29, 1986

[54] TANK APPARATUS FOR HOLDING A RESERVE SUPPLY OF COOLANT FOR A RADIATOR ON A VEHICLE

[75] Inventors: Tetsuo Kaneko, Hirakata; Nobuo Fujita, Uji, both of Japan

[73] Assignee: Kabushiki Kaisha Komatsu Sesiakusho, Japan

[21] Appl. No.: 650,914

[22] Filed: Sep. 14, 1984

[30] Foreign Application Priority Data

Sep. 14, 1983 [JP] Japan .................. 58-141597

[51] Int. Cl.⁴ .................. F28F 9/00; B65D 25/14; B65D 25/20
[52] U.S. Cl. .................. 165/41; 123/41.54; 137/351; 137/584; 220/461
[58] Field of Search .................. 220/461, 85 B, 410, 220/900; 123/41.27, 41.54; 165/129, 98, 148, 149, 41; 138/30; 237/79; 137/584, 376, 377, 351, 343, 264

[56] References Cited

U.S. PATENT DOCUMENTS

| | | | |
|---|---|---|---|
| 1,432,461 | 10/1922 | Harris et al. | 165/149 X |
| 2,201,314 | 5/1940 | Illsley | 123/41.27 X |
| 2,683,443 | 7/1954 | Alexander | 123/41.27 X |
| 3,076,479 | 2/1963 | Ottung | 138/30 |
| 3,168,080 | 2/1965 | Latterner et al. | 123/41.26 |
| 3,757,984 | 9/1973 | Barton | 123/41.54 X |
| 3,968,896 | 7/1976 | Giacoletti et al. | 220/85 B X |
| 4,130,159 | 12/1978 | Ohta et al. | 123/41.54 X |
| 4,182,404 | 1/1980 | Beveridge et al. | 123/41.54 X |

Primary Examiner—Allan N. Shoap
Attorney, Agent, or Firm—Armstrong, Nikaido, Marmelstein & Kubovcik

[57] ABSTRACT

A tank apparatus is disclosed for holding a reserve supply of coolant for a radiator on construction or industrial vehicles. A dual enclosure of rigid material coacts with a radiator guard on a vehicle to define a tank receiving space of prescribed shape within the radiator guard, with the tank receiving space being open to an aperture formed in the top of the radiator guard. A tank fabricated of sheet rubber is relatively closely received in the tank receiving space so as to be held in all parts against the rigid enclosure. The tank has a mouth which is disposed in register with the aperture in the radiator guard and which is closed by a flat closure member of rigid material. The closure member is detachably fastened to the enclosure and is exposed through the aperture in the radiator guard for the installation of a filler neck with a cap. The rubber made tank is free from the possibility of cracking in the face of the possible deformation of the radiator guard and is further readily withdrawable from the tank receiving space through the radiator guard aperture for replacement with a new one.

4 Claims, 7 Drawing Figures

TANK APPARATUS FOR HOLDING A RESERVE SUPPLY OF COOLANT FOR A RADIATOR ON A VEHICLE

BACKGROUND OF THE INVENTION

This invention relates to a tank apparatus for holding a reserve supply of coolant for a radiator on large size vehicles such as construction and industrial vehicles.

Large size vehicles are usually equipped with a reserve coolant tank, in addition to a coolant tank or tanks on and/or below the radiator, for holding an additional supply of coolant to be dispensed as required. The reserve coolant tank may be either installed away from the radiator assembly, comprising the radiator itself and the radiator guard, or built into the radiator assembly. The installation of the reserve coolant tank away from the radiator assembly is objectionable because of the additional installation space required. This objection can of course be overcome by building the tank into the radiator assembly. However, this alternative has heretofore had its own weakness. Since the reserve coolant tank has so far been fabricated from either metal or plastic, the deformation of the radiator guard has been easy to lead to the cracking of the tank, resulting in the leakage of the coolant therefrom. Further, having been permanently or semipermanently secured to the radiator assembly, as by welding, the tank when cracked has not been readily removable from the radiator assembly for replacement with a new one.

SUMMARY OF THE INVENTION

The present invention overcomes the noted problems of the prior art by providing an improved reserve coolant tank apparatus including a tank proper which is compactly built into the tank assembly but which is not to be cracked in the face of the deformation of the other parts of the tank assembly. The tankapparatus is also well calculated to allow easy replacement of the tank.

Stated briefly, the improved reserve coolant tank apparatus in accordance with our invention comprises rigid enclosure means disposed internally of a radiator guard and secured thereto to define a tank receiving space of prescribed shape open to an aperture in the radiator guard. Relatively closely received in the tank receiving space is a tank of elastic material having an approximate shape of the tank receiving space and supported by the enclosure means. The tank has a mouth disposed in register with the aperture in the radiator guard. A rigid closure member closes the mouth in the elastic tank by being bonded or otherwise firmly attached thereto. The closure member is further detachably secured to the enclosure means so as to be exposed through the aperture in the radiator guard.

Preferably the tank is an integral molding of sheet rubber. The sheet rubber tank, together with the rigid closure member closing its mouth, can be readily pushed into the tank receiving space within the enclosure means through the aperture in the radiator guard. The installation of the tank can be completed simply as the closure member is subsequently screwed or otherwise removably fastened to the enclosure means. When thus received in the tank receiving space, the tank is held at nearly all parts against the enclosure means for firmly holding coolant that is to be charged into the tank through filler means formed on the rigid closure member.

Of course, the sheet rubber tank is absolutely free from the possibility of cracking despite the possible deformation of the radiator guard during vehicle operation. Further, when the need arises for tank replacement, the rigid closure member may first be detached from the enclosure means, and then the tank with the closure member thereon may be withdrawn from the tank receiving space through the aperture in the radiator guard by taking advantage of the elasticity of the tank.

The above and other features and advantages of this invention and the manner of realizing them will become more apparent, and the invention itself will best be understood, from a study of the following description and appended claims, with reference had to the attached drawings showing a preferred embodiment of the invention.

DESCRIPTION OF THE PREFERRED EMBODIMENT

Figure 1:
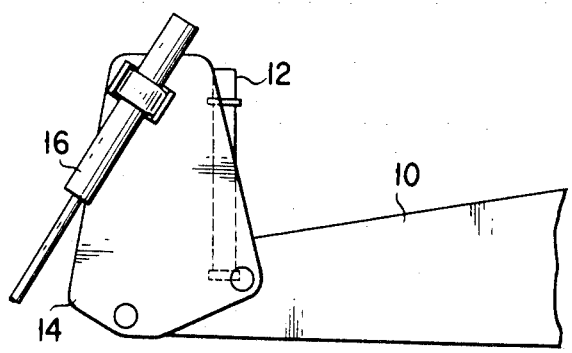
FIG. 1 is a partial, diagrammatic side elevation of the vehicle incorporating the improved reserve coolant tank apparatus of this invention, showing in particular the radiator and the radiator guard on the vehicle.
Figure 2:
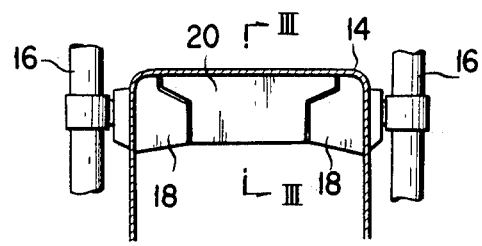
FIG. 2 is a rear elevation of the arrangement of FIG. 1, as seen from the right hand side of FIG. 1.
Figure 3:
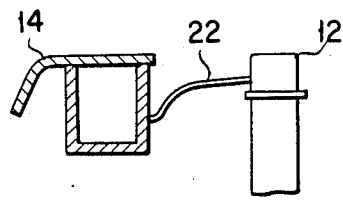
FIG. 3 is a section through the arrangement of FIGS. 1 and 2, taken along the line III—III of FIG. 2.

FIGS. 1 through 3 of the above drawings diagrmmatically illustrate, to an extent necessary for a full understanding of the present invention, the organization of a vehicle to which the invention finds application. At 10 in FIG. 1 there is shown the main frame of the vehicle which as a radiator 12 and radiator guard 14 fixedly mounted at or adjacent its front end. The radiator guard 14 has a conventional pair of hydraulic implement actuator cylinders 16 operatively mounted externally on its opposite sides.

As will be seen from FIG. 2, the interior of the radiator guard 14 has a pair of mounting means 18 on its opposite sides reserved for the mounting and operation of the implement actuator cylinders 16. A space 20 intervening the spaces 18 is intended for the installation of the reserve coolant tank, not shown in FIGS. 1 through 3, in accordance with the invention. The reserve coolant tank is to be communicated with the radiator 12 by way of conduit seen at 22 in FIG. 3.

Figure 4:
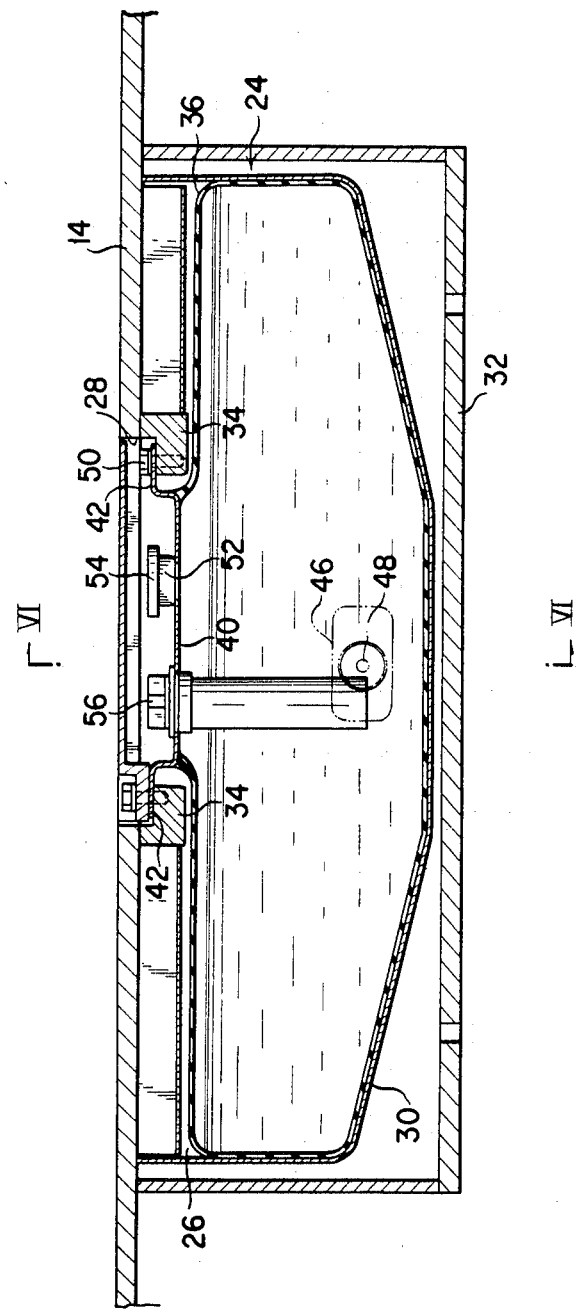
FIG. 4 is an enlarged, fragmentary, vertical sectional view showing in detail the reserve coolant tank apparatus constructed in accordance with the invention and as adapted for use with the vehicle of FIGS. 1 through 3.
Figure 5:
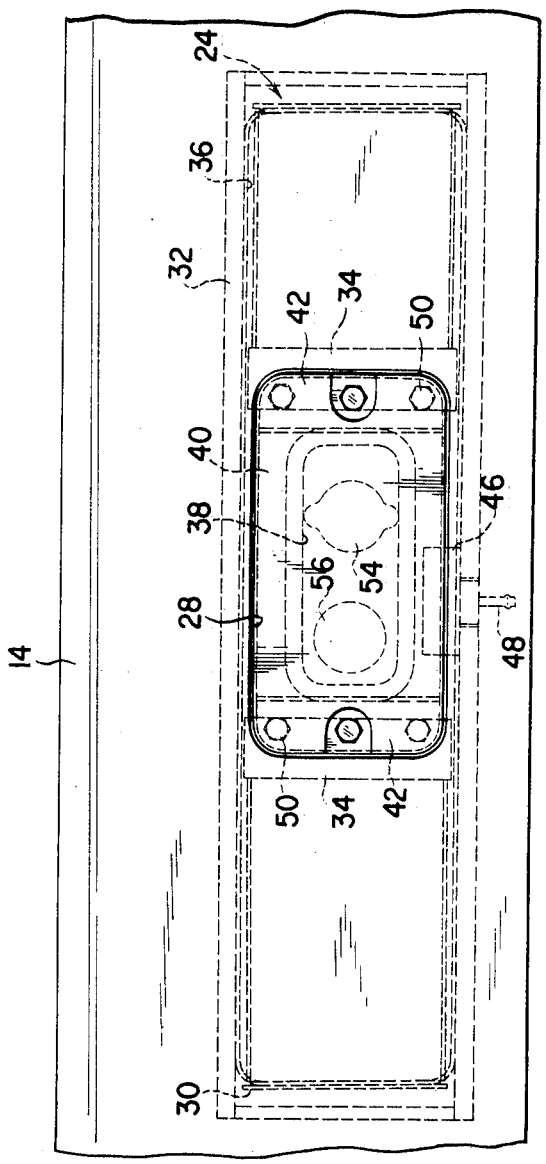
FIG. 5 is a plan view of the reserve coolant tank apparatus of FIG. 4.
Figure 6:
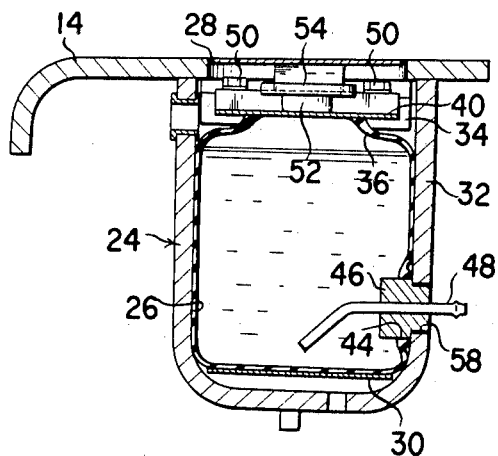
FIG. 6 is a vertical section through the reserve coolant tank apparatus, taken along the line VI—VI in FIG. 4.

Reference is now directed to FIGS. 4 through 7 for a more detailed description of the reserve coolant tank apparatus in accordance with the invention. It will be observed from FIGS. 4 through 6 that a rigid, dual enclosure 24 is disposed internally of the radiator guard 14 and is welded or otherwise firmly attached thereto to define a tank receiving space 26 of prescribed shape which is open to an aperture 28 defined in the top of the radiator guard. The dual enclosure 24 comprises a relatively thin inner enclosure 30 and a thicker outer enclosure 32, both made of metal. Preferably, and as shown in FIG. 4, a pair of flat reinforcement members 34 are secured directly to the inside surface of the radiator guard 14 and coact with the dual enclosure 24 to define the tank receiving space 26. These reinforcement members may be considered parts of the enclosure 24.

Figure 7:
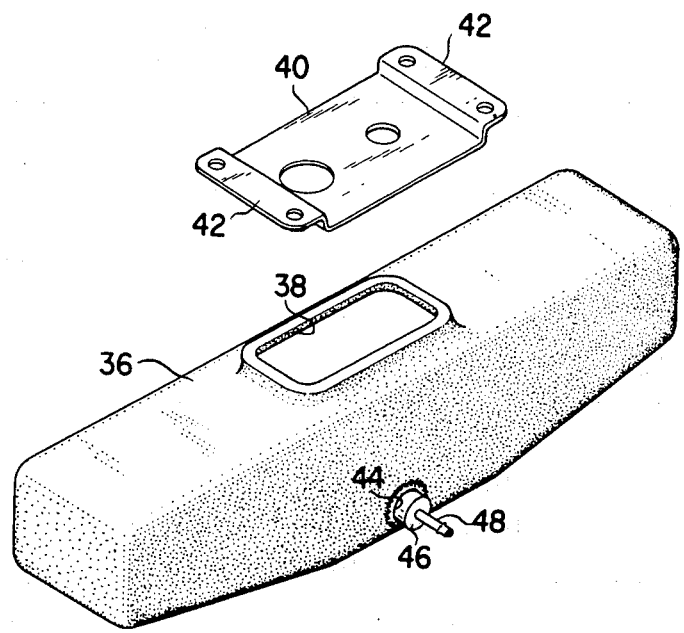
FIG. 7 is an exploded perspective view of the tank proper and rigid closure member of the tank apparatus of FIGS. 4 through 6.

Received in the tank receiving space 26 is a reserve coolant tank 36 best illustrated in FIG. 7. The tank 36 is shown as an integral molding of sheet rubber, either natural or synthetic, having approximately the same shape and size as the tank receiving space 26. The tank 36 has a mouth 38 formed in its top so as to be in register with the aperture 28 in the radiator guard 14 when the tank is received in the tank receiving space 26, as best shown in FIG. 4. The mouth 38 is permanently or semipermanently closed by a rectangular closure member 40 of metal, complete with a pair of mounting flanges 42 at its opposite ends, which may be bonded to the rubber tank by the vulcanization of the latter. The tank 36 has a comparatively small outlet opening 44 formed in one side thereof which also is semipermanently closed by a closure member 46 of metal. This second closure member may also be bonded to the rubber tank 36 by vulcanization. An outlet pipe 48 extends through the second closure member 46 for the dispensation of the coolant contained in the tank.

The tank 36 of the above construction is so pliant that it can be readily pushed into the tank receiving space 26 through the radiator guard aperture 28. The mounting of the tank 36 can be completed simply by subsequently fastening the pair of mounting flanges 42 of the first closure member 40, closing the tank mouth 38, to the pair of reinforcement members 34 as by screws 50. When thus mounted in position, the tank 36 has nearly all its parts held against the enclosure 24 to be supported thereby, as will be seen from FIGS. 4 and 6.

Exposed through the radiator guard aperture 28, the first closure member 40 has mounted thereon a filler neck 52, complete with a filler cap 54, and a level sensor 56. As clearly seen in FIG. 6, the second closure member 46 is partly received in, and exposed through, an opening 58 in the enclosure 24, so that the outlet pipe 48 extends outwardly of the enclosure for communication with the radiator 12 through the conduit 22 shown in FIG. 3.

Such being the construction of the reserve coolant tank apparatus in accordance with the invention, it will be seen that coolant can be charged into the tank 36 through the filler neck 52 and dispensed from the tank through the outlet pipe 48 in the usual manner. The tank 36 can be firmly maintained in shape in the tank receiving space 26 despite such coolant introduction and withdrawal since it is nearly wholly held against the rigid enclosure 24 and since the rigid first closure member 40 integral with the tank is screwed to the reinforcement members 34.

Being molded of rubber, the tank 36 is of course not to crack in spite of the possible deformation of the radiator guard 14 or of the enclosure 24 during the operation of the vehicle. Further, as required, the tank 36 can be readily withdrawn from the tank receiving space 26 through the radiator guard aperture 28 by loosening the screws 50.

It will of course be understood that the details in the construction of the reserve coolant tank apparatus are subject to change depending upon each particular vehicle to which the invention is applied. Various changes may therefore be made in the form, details, arrangements, and proportions of the parts without departing from the scope of the invention as set forth in the appended claims.

What is claimed is:

1. A tank apparatus for holding a reserve supply of coolant for a radiator on a vehicle, comprising:
    (a) a radiator guard having sides and a connecting wall together surrounding an interior space, said guard having an aperture defined therethrough;
    (b) a pair of mounting means, each mounting means being secured to each side of the radiator guard in said interior space;
    (c) rigid enclosure means disposed internally of the radiator guard and fitting between said pair of mounting means so as to be firmly attached thereto, the enclosure means defining a tank receiving space of prescribed shape open to the aperture in the radiator guard;
    (d) a tank of elastic material having an approximate shape of the tank receiving space within the enclosure means and relatively closely received in the tank receiving space so as to be supported by the enclosure means, the tank having a mouth defined therein in register with the aperture in the connecting wall of said radiator guard and an outlet opening formed therein;
    (e) a rigid closure member closing the mouth in the tank and firmly attached thereto, the closure member being detachably secured to the enclosure means so as to be exposed through the aperture in the radiator guard;
    (f) a second closure member of rigid material semipermanently closing the outlet opening in the tank, and
    (g) an outlet pipe extending through the second closure member and the enclosure means for the delivery of coolant from the tank to the radiator,
    whereby the tank is free from cracking and is readily withdrawable together with the closure member from the tank receiving space.

2. The tank apparatus of claim 1 wherein the tank is fabricated of sheet rubber.

3. The tank apparatus of claim 1 further comprising filler means formed on the closure member for charging coolant into the tank.

4. The tank apparatus of claim 1 further comprising reinforcement means secured to the radiator guard and coacting with the enclosure means to define the tank receiving space.

* * * * *

UNITED STATES PATENT AND TRADEMARK OFFICE
CERTIFICATE OF CORRECTION

PATENT NO. : 4,585,052

DATED : April 29, 1986

INVENTOR(S) : Tetsuo KANEKO et al

It is certified that error appears in the above-identified patent and that said Letters Patent is hereby corrected as shown below:

On the cover page, Item [73], "Kabushiki Kaisha Komatsu Sesiakusho" should read --Kabushiki Kaisha Komatsu Seisakusho--.

Signed and Sealed this

Twenty-first Day of October, 1986

[SEAL]

*Attest:*

DONALD J. QUIGG

*Attesting Officer*　　　　*Commissioner of Patents and Trademarks*